US008947533B2

United States Patent
Bandou

(10) Patent No.: US 8,947,533 B2
(45) Date of Patent: Feb. 3, 2015

(54) PARAMETER DETERMINING DEVICE, PARAMETER DETERMINING SYSTEM, PARAMETER DETERMINING METHOD, AND RECORDING MEDIUM

(75) Inventor: Fumiaki Bandou, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 399 days.

(21) Appl. No.: 13/574,711

(22) PCT Filed: Jan. 21, 2011

(86) PCT No.: PCT/JP2011/051100
§ 371 (c)(1),
(2), (4) Date: Jul. 23, 2012

(87) PCT Pub. No.: WO2011/090163
PCT Pub. Date: Jul. 28, 2011

(65) Prior Publication Data
US 2012/0293659 A1 Nov. 22, 2012

(30) Foreign Application Priority Data

Jan. 22, 2010 (JP) ................................. 2010-012213

(51) Int. Cl.
*H04N 7/18* (2006.01)
*H04N 17/00* (2006.01)
*G06K 9/00* (2006.01)
(Continued)

(52) U.S. Cl.
CPC .......... *H04N 17/002* (2013.01); *G06K 9/00791* (2013.01); *G06K 9/3216* (2013.01); *H04N 5/23238* (2013.01); *H04N 5/247* (2013.01)
USPC ....................................................... 348/148

(58) Field of Classification Search
USPC .................. 348/148, 143, 147, 149, 159
See application file for complete search history.

(56) References Cited

U.S. PATENT DOCUMENTS 7,307,655 B1    12/2007    Okamoto et al.
2008/0170122 A1    7/2008    Hongo et al.
(Continued)

FOREIGN PATENT DOCUMENTS

| JP | A-2001-187552 | 7/2001 |
| JP | B2-3286306 | 5/2002 |
| JP | A-2002-324235 | 8/2002 |
| JP | A-2005-217889 | 8/2005 |
| JP | A-2006-253872 | 9/2006 |

(Continued)

OTHER PUBLICATIONS

International Search Report issued in International Patent Application No. PCT/JP2011/051100 dated Mar. 8, 2011.
(Continued)

*Primary Examiner* — Michael Lee
(74) *Attorney, Agent, or Firm* — Oliff PLC

(57) ABSTRACT

A parameter determining device configured to be installed in a vehicle includes an image acquirer, a parameter identifier, a synthetic image generator, and a validity judger. The image acquirer acquires camera images captured by cameras provided on the vehicle. The parameter identifier identifies installation parameters of the cameras based on the acquired camera images. The synthetic image generator generates a synthetic image showing a periphery of the vehicle viewed from a prescribed virtual viewpoint based on the acquired camera images and the identified installation parameters. The validity judger compares the synthetic image with a reference image showing the periphery of the vehicle viewed from a prescribed position to judge whether the identified installation parameters have validity.

14 Claims, 15 Drawing Sheets

(51) Int. Cl.
*G06K 9/32* (2006.01)
*H04N 5/232* (2006.01)
*H04N 5/247* (2006.01)

(56) References Cited

U.S. PATENT DOCUMENTS

| | | | |
|---|---|---|---|
| 2008/0181488 A1* | 7/2008 | Ishii et al. | 382/154 |
| 2008/0309763 A1* | 12/2008 | Hongo | 348/148 |
| 2009/0299684 A1* | 12/2009 | Imanishi et al. | 702/150 |
| 2010/0253784 A1* | 10/2010 | Oleg | 348/187 |

FOREIGN PATENT DOCUMENTS

| | | |
|---|---|---|
| JP | A-2007-261463 | 10/2007 |
| JP | A-2008-172535 | 7/2008 |
| JP | A-2009-267602 | 11/2009 |
| JP | A-2009-267606 | 11/2009 |
| JP | A-2009-288152 | 12/2009 |
| WO | WO 00/07373 A1 | 2/2000 |

OTHER PUBLICATIONS

Office Action issued in Japanese Patent Application No. 2010-012213 dated May 14, 2013 (with partial translation).

* cited by examiner

# PARAMETER DETERMINING DEVICE, PARAMETER DETERMINING SYSTEM, PARAMETER DETERMINING METHOD, AND RECORDING MEDIUM

TECHNICAL FIELD

The present invention relates to a technology to determine installation parameters for installation of in-vehicle cameras mounted on a vehicle.

BACKGROUND ART

Up to now, there is known an image display device which is mounted on a vehicle such as an automobile to display images that are obtained by capturing images of a periphery of the vehicle through in-vehicle cameras on a display provided in a cabin. Using this image display device, a driver is able to grasp the situation around the vehicle in near real time.

In the case of installing in-vehicle cameras of an image display device on a vehicle, however, shift occurs between the position of an object image contained in an image that is displayed and the position on the design due to a slight error on the installation of the in-vehicle cameras for the vehicle. To address this problem, for example, Japanese Unexamined Patent Application Publication No. 2007-261463 (Patent Literature 1) discloses that installation parameters (for example, a roll angle, a tilt angle, a pan angle, and the like) for the actual installation of in-vehicle cameras are determined through performing of a calibration process, and an image to be displayed is processed using the installation parameters.

In general, a calibration process is performed in a manner that a user (a worker who sets up an image display device) displays images obtained by performing capturing through in-vehicle cameras in a state where markers of a prescribed shape are disposed on the outside of a vehicle, and designates positions of images of the markers contained in the images.

SUMMARY OF INVENTION

Problems to Be Solved by Invention

Recently, there has been proposed an image display device that generates and displays on a display a synthetic image showing a state of a periphery of a vehicle viewed from a certain virtual viewpoint such as right above or the rear of the vehicle using images obtained by capturing camera images of a periphery of the vehicle through in-vehicle cameras. For example, in such an image display device that is disclosed in the gazette of Japanese Patent No. 3286306 (Patent Literature 2), it is also possible to display an image showing the whole periphery of the vehicle.

Even in the case of using the in-vehicle cameras to generate the synthetic image, the calibration process is performed for each of the in-vehicle cameras and an installation parameter is determined for each of the in-vehicle cameras. Further, images are synthesized using the installation parameter for each of the in-vehicle cameras to generate a synthetic image. Accordingly, the quality of the generated synthesized image is affected by the accuracy of determining the installation parameter for each of the in-vehicle parameter.

However, traditionally, the criterion of whether the calibration process has been accurately performed (that is, the criterion of validity of the installation parameter) is not present, and thus proper installation parameters have not been determined from the viewpoint of the quality of the synthetic image being generated. As a result, there is a possibility that a synthetic image that is not suitable to show the pattern at the periphery of the vehicle is generated.

Accordingly, the present invention has been made in consideration of the above-described situations, and an object of the present invention is to provide a technology that can determine proper installation parameters from the viewpoint of the quality of a synthetic image being generated.

Means for Solving Problems

In order to solve the above-described problems, according to the present invention, those listed below may be provided.

(1) A parameter determining device configured to be installed in a vehicle, which includes: an image acquirer configured to acquire camera images captured by cameras provided on the vehicle; a parameter identifier configured to identify installation parameters of the cameras based on the acquired camera images; a synthetic image generator configured to generate a synthetic image based on the acquired camera images and the identified installation parameters, the synthetic image showing a periphery of the vehicle viewed from a prescribed virtual viewpoint; and a validity judger configured to compare the synthetic image with a reference image to judge whether the identified installation parameters have validity, the reference image showing the periphery of the vehicle viewed from a prescribed position.

(2) According to (1), the reference is an actual image of the periphery of the vehicle which is captured by an external camera disposed on an outside of the vehicle.

(3) According to (1) or (2), each of the prescribed virtual viewpoint and the prescribed position is right above of the vehicle.

(4) According to any one of (1) to (3), the parameter determining device further includes a brightness adjuster configured to adjust an average brightness of the synthetic image to be substantially coincident with an average brightness of the reference image, before the validity judger compares the synthetic image with the reference image.

(5) According to any one of (1) to (4), each of the synthetic image and the reference image contains a pattern at the periphery of the vehicle.

(6) According to (5), the pattern entirely surrounds the vehicle.

(7) According to any one of (1) to (6), the validity judger is configured to automatically judge the validity of the installation parameters when the installation parameters are identified.

(8) According to any one of (1) to (7), the parameter determining device further includes a storage configured to store the reference image.

(9) A parameter determining system, which includes: an external camera configured to capture an image of a periphery of a vehicle viewed from a prescribed position as a reference image; cameras provided on the vehicle; and a parameter determining device configured to be installed in the vehicle, wherein the parameter determining device includes: an image acquirer configured to acquire camera images captured by the cameras; a parameter identifier configured to identify installation parameters of the cameras based on the acquired camera images; a synthetic image generator configured to generate a synthetic image based on the acquired camera images and the identified installation parameters, the synthetic image showing a periphery of the vehicle viewed from a prescribed virtual viewpoint; and a validity judger configured to compare the synthetic image with the reference image to judge whether the identified installation parameters have validity.

(10) According to (9), the parameter determining system further includes a pattern arranged to be disposed at the periphery of the vehicle.

(11) According to (10), the pattern is arranged so as to entirely surround the vehicle.

(12) A parameter determining method, which includes: acquiring camera images captured by cameras provided on a vehicle; identifying installation parameters of the cameras based on the acquired camera images; generating a synthetic image based on the acquired camera images and the identified installation parameters, the synthetic image showing a periphery of the vehicle viewed from a prescribed virtual viewpoint; and comparing the synthetic image with a reference image to judge whether the identified installation parameters have validity, the reference image showing the periphery of the vehicle viewed from a prescribed position.

(13) According to (10), the parameter determining method further includes: placing the vehicle at a prescribed location so that a pattern is disposed at the periphery of the vehicle; and capturing an actual image of the periphery of the vehicle with an external camera disposed on an outside of the vehicle, as the reference image.

(14) A recording medium having recorded a computer-readable program configured to cause a computer to execute the parameter determining method described in (12) or (13).

Advantageous Effects of Invention

According to the configuration of (1) to (14), since the validity of the installation parameters is judged through comparison of the generated synthetic image with the reference image, the proper installation parameters can be determined from the viewpoint of the quality of the synthetic image being generated.

Further, according to the configuration of (2), since the reference image is acquired through capturing of the actual image of the periphery of the vehicle with the external camera, it is possible to determine the proper installation parameters even without precise placement of the vehicle or the markers.

Further, according to the configuration of (3), it is possible to determine the installation parameters through which the synthetic image showing the whole periphery of the vehicle can be properly generated.

Further, according to the configuration of (4), it is possible to accurately compare the synthetic image with the reference image.

Further, according to the configuration of (5), (10), and (13), it is possible to accurately compare the synthetic image with the reference image.

Further according to the configuration of (6) and (11), it is possible to determine the proper installation parameters from the viewpoint of the quality of the synthetic image showing the whole periphery of the vehicle.

Further, according to the configuration of (7), since the judgment is automatically made when the installation parameters are identified, a cumbersome user operation is not required.

MODE TO CARRY OUT INVENTION

Hereinafter, preferred embodiments of the present invention will be described in detail with reference to the accompanying drawings.

<1. Configuration>

Figure 1:
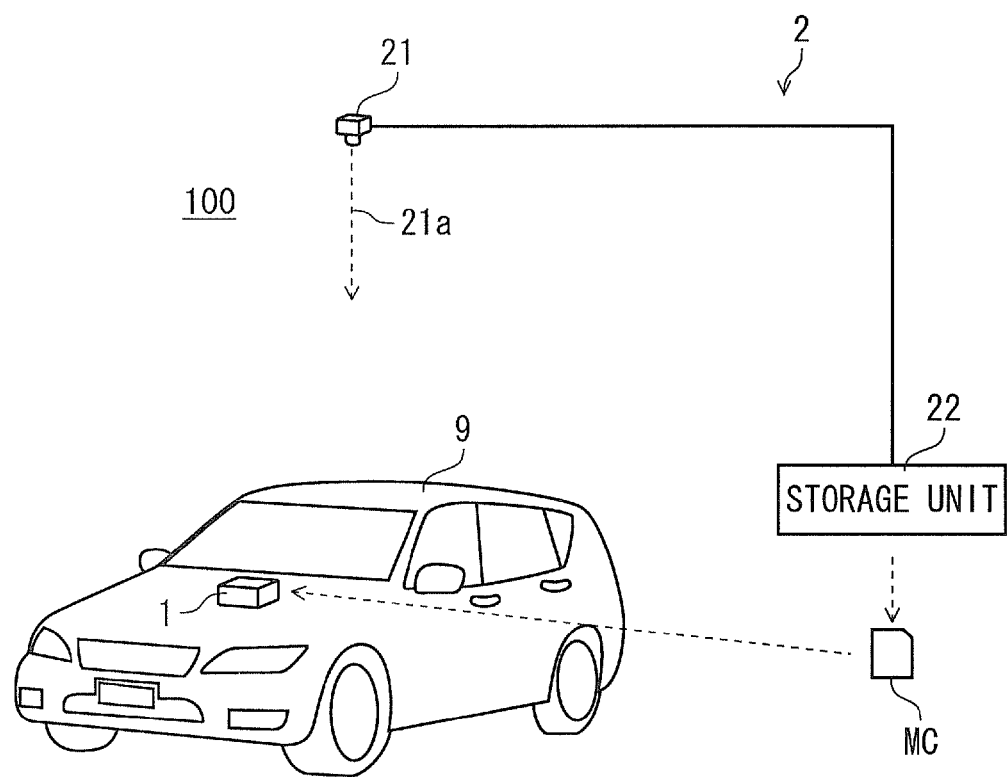
FIG. 1 is a view illustrating an overview of a parameter determining system.

FIG. 1 is a view illustrating an overview of a parameter determining system 100 according to an embodiment of the present invention. The parameter determining system 100 determines installation parameters for the installation of in-vehicle cameras mounted on a vehicle (in an embodiment of the present invention, automobile) 9. The parameter determining system 100 includes a reference image acquiring device 2 that is placed on an outside of the vehicle 9, and an image display device 1 mounted on the vehicle 9.

The reference image acquiring device 2 is fixedly placed at workplace in which the image display device 1 is installed on the vehicle 9 in a vehicle factory or vehicle maintenance plant. The reference image acquiring device 2 includes a vehicle external camera 21 (in the present invention, an external camera) that captures images of an outside of the vehicle 9, and a recording unit 22 that records the images obtained from the vehicle external camera 21. The vehicle external camera 21 is placed right above of the vehicle 9, and the recording unit 22 is placed in a position in which a worker who is to install the image display device 1 can easily work. The vehicle exterior camera 21 and the recording unit 22 are communicatively connected to each other through a cable or the like.

The vehicle external camera 21 captures images of the vehicle 9 and a periphery of the vehicle 9 in a state where it is directed to an optical axis 21a in the vertical direction from direct above of the vehicle 9. Through this, the images showing the vehicle 9 and the periphery of the vehicle 9 are acquired. The acquired images are transmitted to the recording unit 22, and are recorded in a memory card MC that is a portable recording medium in the recording unit 22. The image recorded as described above becomes a reference image that is used to judge whether the calibration process has been accurately perform in the image display device 1, and is transferred to the image display device 1 through the memory card MC.

The image display device 1 is configured to generate images through capturing of the images of the periphery of the vehicle 9 and to display the generated images on a display. The image display device 1 is installed in a proper position in a cabin, such as an instrument panel of the vehicle 9, so that a display screen is visible from a driver. By viewing the display screen of the image display device 1, the driver of the vehicle 9 can grasp the situation around the vehicle in near real time. Further, the image display device 1 also functions as a navigation device, and it is possible to perform a navigation guide for the driver of the vehicle 9.

Further, the image display device 1 is also configured as a parameter determining device that performs a calibration process for determining installation parameters for the installation of the in-vehicle camera mounted on the vehicle 9. The image display device 1 uses the reference image that is transferred from the reference image acquiring device 2 in judging whether the calibration process has been accurately performed (hereinafter referred to as "calibration judgment").

Figure 2:
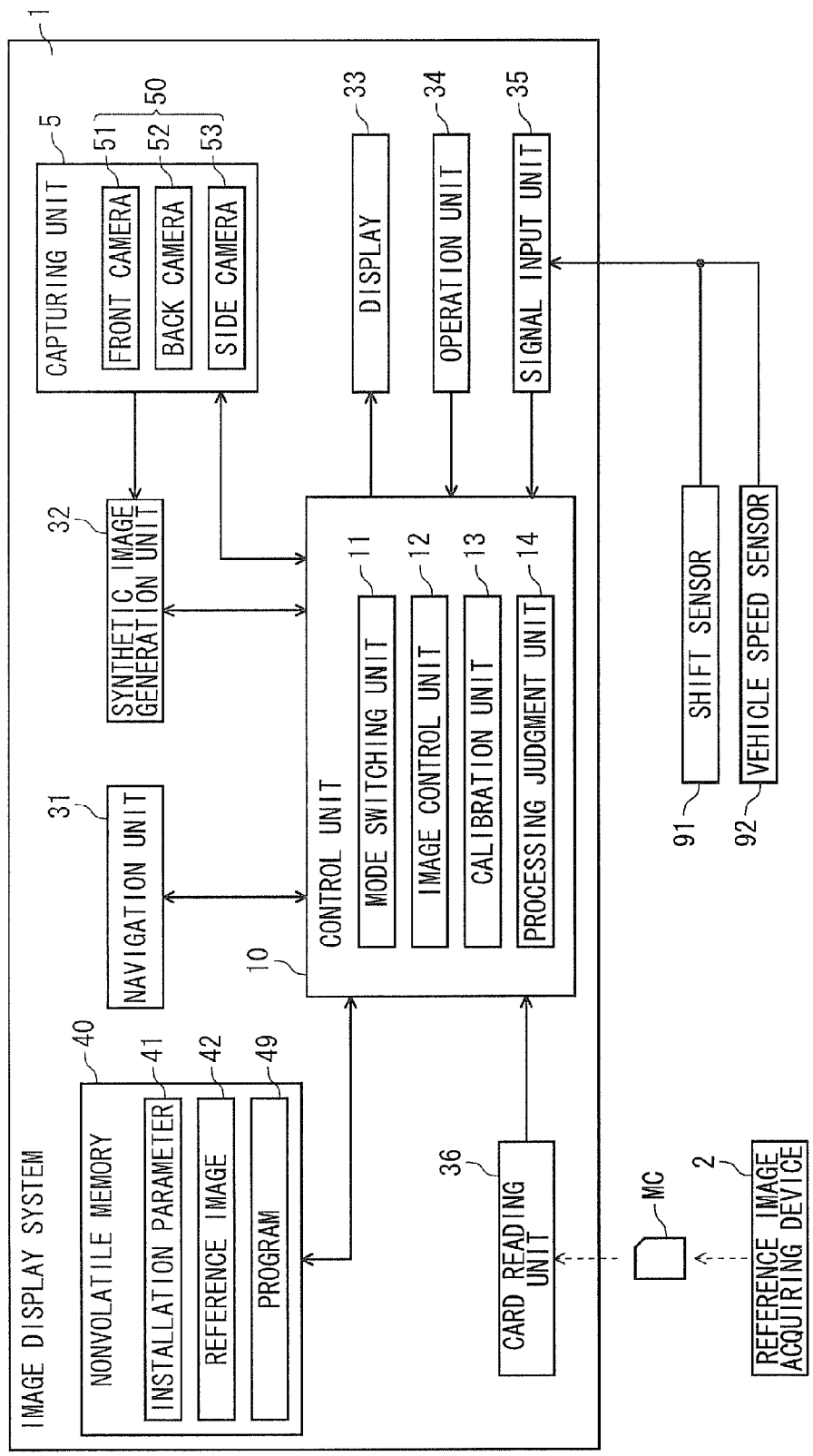
FIG. 2 is a block diagram illustrating the configuration of an image display device.

FIG. 2 is a block diagram mainly illustrating the configuration of the image display device 1. As shown in the drawing, the image display device 1 includes a capturing unit 5 capturing image of a periphery of a vehicle 9, a synthetic image generation unit 32 processing the imaged acquired by the capturing unit 5, a navigation unit 31 realizing a navigation function, a display 33 displaying various kinds of information, and an operation unit 34 receiving a user operation.

The capturing unit 5 includes a front camera 51, a back camera 52, and a side camera 53 as in-vehicle cameras 50. These in-vehicle cameras 50 are provided with an image pickup element such as CCD or CMOS, and electronically acquire the images.

Figure 3:
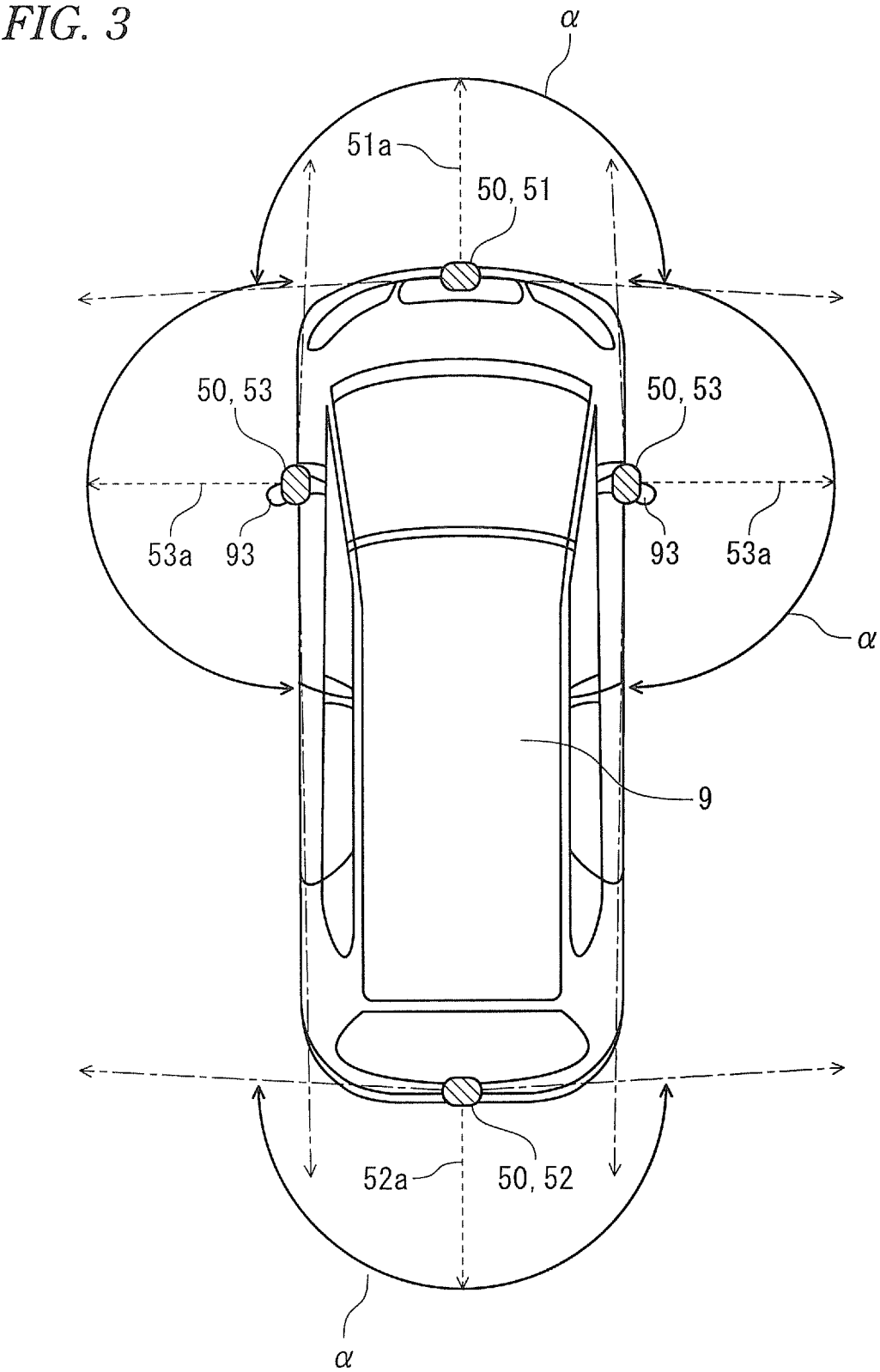
FIG. 3 is a view illustrating locations in which in-vehicle cameras are installed in a vehicle.

FIG. 3 is a view illustrating locations in which in-vehicle cameras 50 are installed in a vehicle 9. As shown in FIG. 3, the front camera 51 is provided in the vicinity of the mounting position of a vehicle license plate at the front end of the vehicle 9, and its optical axis 51*a* is directed in the straight direction. The back camera 52 is provided in the vicinity of the mounting position of a vehicle license plate at the rear end of the vehicle 9, and its optical axis 52*a* is directed in the opposite direction of the straight direction of the vehicle 9. Further, the side cameras 53 are provided on the left and right door mirrors 93, and its optical axis 53*a* is directed to the outside along the left/right direction of the vehicle 9.

Fish-eye lenses are adopted as lenses of the in-vehicle cameras 50, and the respective in-vehicle cameras 50 have an angle $\alpha$ of view of 180 degrees or more. Accordingly, by using the four in-vehicle cameras 40, it is possible to capture images of the whole periphery of the vehicle 9. Further, it is possible to duplicate image capturing of respective areas of the left front, right front, left rear, and right rear of the vehicle 9 through two in-vehicle cameras 50 of four in-vehicle cameras 50.

Referring again to FIG. 2, the synthetic image generation unit 321 is configured as a hardware circuit that can perform various kinds of image processing. The synthetic image generation unit 32 functions as an image acquirer and a synthetic image generator according to the present invention, and generates a synthetic image showing the state of the periphery of the vehicle viewed from a prescribed virtual view point based on the images (in the present invention, camera images) acquired by the in-vehicle cameras 50 of the capturing unit 5. The technique of generating the synthetic image viewed from the virtual viewpoint through the synthetic image generation unit 32 will be described later.

The navigation unit 31 is configured as a dedicated substrate that outputs various kinds of information for the navigation guide. Specifically, the navigation unit 31 outputs a map image that corresponds to the current position of the vehicle 9, and in the case where the destination has been set, it sets a root up to the destination to output guide information corresponding to the root.

The display 33 is provided with a liquid crystal panel, and displays a synthetic image generated by the synthetic image generation unit 32 or a map image provided from the navigation unit 31. The display 33 has a touch panel function, and thus can receive various operations from a user. Further, the operation unit 34 is composed of physical buttons, and receives various operations from the user.

Further, the image display device 1 includes a signal input unit 35, a card reading unit 36, and a nonvolatile memory 40.

Signals from various devices on the outside of the image display device 1 provided on the vehicle 9 are input to the signal input unit 35. Specifically, the signals indicating various kinds of information are input from a shift sensor 91, a vehicle speed sensor 92, and the like, to the signal input unit 35. From the shift sensor 91, positions of operations of a shift lever of a transmission of the vehicle 9, that is, shift positions of "P (Park)", "D (Drive)", "N (Neutral)", and "R (Reverse)", are input. From the vehicle speed sensor 92, a traveling speed (km/h) of the vehicle 9 at that time is input.

The card reading unit 36 reads a memory card MC that is a portable recording medium. The memory card MC is composed of a flash memory or the like that can store various kinds of data, and the image display device 1 can use the various kinds of data stored in the memory card MC.

Further, the nonvolatile memory 40 is configured as a flash memory or the like that can keep the stored contents even when the electric power is turned off. In the nonvolatile memory 40, installation parameters 41, reference images 42, and programs 49 are stored.

The installation parameters 41 indicate information on the installation of four in-vehicle cameras 50 on the vehicle 9. Specifically, the installation parameters 41 include a roll angle, a tilt angle, and a pan angle for each in-vehicle camera 50. The installation parameters 41 are determined in the calibration process, and are used when the synthetic image generation unit 32 generates the synthetic image.

The reference image 42 is used for the calibration judgment. The reference image 42 is acquired by reading the memory card MC recorded by the reference image acquiring device 2 through the card reading unit 36.

The program 49 is firmware of the image display device 1. The program 49 can be updated by reading the memory card MC in which a new program is stored through the card reading unit 36.

Further, the image display device 1 is provided with the control unit 10 for controlling the above-described units. The control unit 10 is configured as a computer having a CPU, a RAM, a ROM, and the like. Various control functions of the control unit 10 are realized as the CPU performs arithmetic processing according to the program 49 stored in the nonvolatile memory 40. The mode change unit 11, the image control unit 12, the calibration unit 13, and the processing judgment unit 14 shown in the drawing correspond to part of functions of the control unit 10 realized as described above.

The mode switching unit 11 is intended to switch the operating mode of the image display device 1. The image display device 1 has a navigation mode for guiding navigation and an image display mode for showing the state of the periphery of the vehicle 9, and typically, these two modes are switched by the mode switching unit 11 according to a prescribed condition.

The image control unit 12 controls the process of generating a synthetic image that is executed by the synthetic image generation unit 32. For example, in the case of generating a synthetic image, the image control unit 12 reads the installation parameters 41 from the nonvolatile memory 40, and transmits the installation parameters 41 to the synthetic image generation unit 32.

The calibration unit 13 functions as a parameter identifier according to the invention, and performs the calibration process that identifies the installation parameters for the installation of four in-vehicle cameras 50. Further, the processing judgment unit 14 performs the calibration judgment. That is, the processing judgment unit 14 functions as a validity judger according to the present invention, and judges the validity of the installation parameters 41 identified in the calibration process. The details of the function of the control unit 100 will be described later.

<2. Generation Of Synthetic Image>

Figure 4:
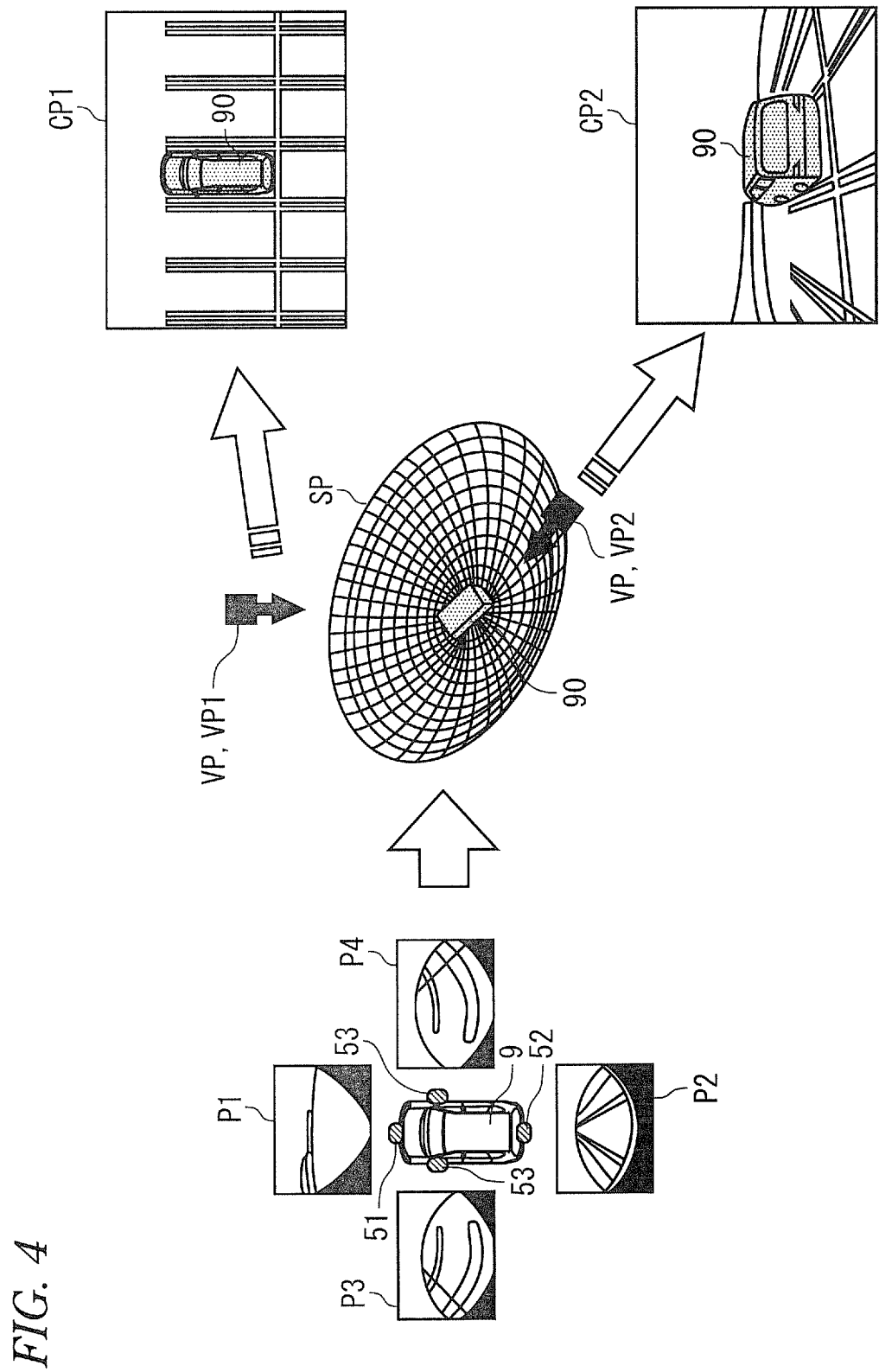
FIG. 4 is a view illustrating a technique of generating a synthetic image.

Then, a technique, in which the synthetic image generation unit 32 generates a synthetic image showing the state of the periphery of the vehicle 9 viewed from a certain virtual viewpoint on the basis of the images obtained by the capturing unit 5, will be described. In the case of generating the synthetic image, the installation parameters 41 pre-stored in the nonvolatile memory 40 are used. FIG. 4 is a view illustrating the technique of generating a synthetic image.

If image capturing is performed simultaneously in the front camera 51, the back camera 52, and the side camera 53 of the capturing unit 5, four images P1 to P4 showing the front, rear, left, and right directions of the vehicle 9 are acquired. That is, the four captured images P1 to P4 acquired by the capturing unit 5 contain information showing the whole periphery of the vehicle 9 at the time of capturing.

Then, respective pixels of the four images P1 to P4 are projected onto a three-dimensional (3D) curved surface SP in a virtual three-dimensional space. The 3D curved surface SP2, for example, is substantially in a hemispheric shape (bowl shape), and the center portion thereof (the bottom portion of the bowl) is determined as the position in which the vehicle 9 is present. The correspondence relationship has been determined between the positions of the respective pixels included in the images P1 to P4 and the positions of the respective pixels of the 3D curved surface SP. Accordingly, the values of the respective pixels of the 3D surface SP can be determined on the basis of the values of the respective pixels included in the captured images P1 to P4.

The correspondence relationship between the positions of the respective pixels of the images P1 to P4 and the positions of the respective pixels of the 3D curved surface SP is changed depending on the installation parameters 41 (roll angle, tilt angle, pan angle, and the like) of the four in-vehicle cameras 50. Because of this, the correspondence relationship between the standard and default is corrected using the installation parameters 41 stored in the nonvolatile memory, and this corrected correspondence relationship is used in the projection of the 3D curved surface SP.

Further, polygon data that indicates the shape or size of the vehicle body pre-stored in the nonvolatile memory 40 is used, and a vehicle image 90 that is a polygon model showing the 3D shape of the vehicle 9 is virtually configured. The configured vehicle image 90 is placed in the center portion of the substantially hemispheric shape that is determined as the position of the vehicle 9 in the 3D space in which the 3D curved surface SP is set.

Further, in the 3D space in which the 3D curved surface SP is present, the virtual viewpoint VP is set by the image control unit 12 of the control unit 10. The virtual viewpoint VP is defined by the viewpoint position and the viewing direction, and is set at a certain viewpoint position that corresponds to the periphery of the vehicle 9 and toward a certain viewing direction in the 3D space.

Then, depending on the set virtual viewpoint VP, a necessary area in the 3D curved surface SP is cut off as the image. The relationship between the virtual viewpoint VP and the necessary area in the 3D curved surface SP is predetermined and pre-stored in the nonvolatile memory 40 as table data. On the other hand, rendering is performed with respect to the vehicle image 90 configured as a polygon to correspond to the set virtual viewpoint VP, and two-dimensional (2D) vehicle image 90 that is the result of the rendering overlaps the cut image. Through this, a synthetic image showing the state of the vehicle 9 and the periphery of the vehicle 9 viewed from the certain virtual time point is generated.

For example, if a virtual viewpoint VP1 is set in a state where the viewpoint position is a position right above of almost the center of the vehicle 9, and the viewing direction is almost right below of the vehicle 9, a synthetic image CP1 showing the state of the vehicle 9 and the periphery of the vehicle 9 viewed from almost right above of the vehicle 9 is generated. Further, as shown in the drawing, if a virtual viewpoint VP2 is set in a state where the viewpoint position is the left rear of the vehicle 9, and the viewing direction is almost front of the vehicle 9, a synthetic image CP2 showing the state of the vehicle 9 and the periphery of the vehicle 9 viewed from the left rear of the vehicle 9 to the whole periphery thereof is generated.

On the other hand, in the case of actually generating the synthetic image, it is not necessary to determine the values of all the pixels of the 3D curved surface SP2, but by determining only the values of the pixels of the area that becomes necessary to correspond to the set virtual viewpoint VP on the basis of the images P1 to P4, the processing speed can be improved.

<3. Mode Change>

Figure 5:
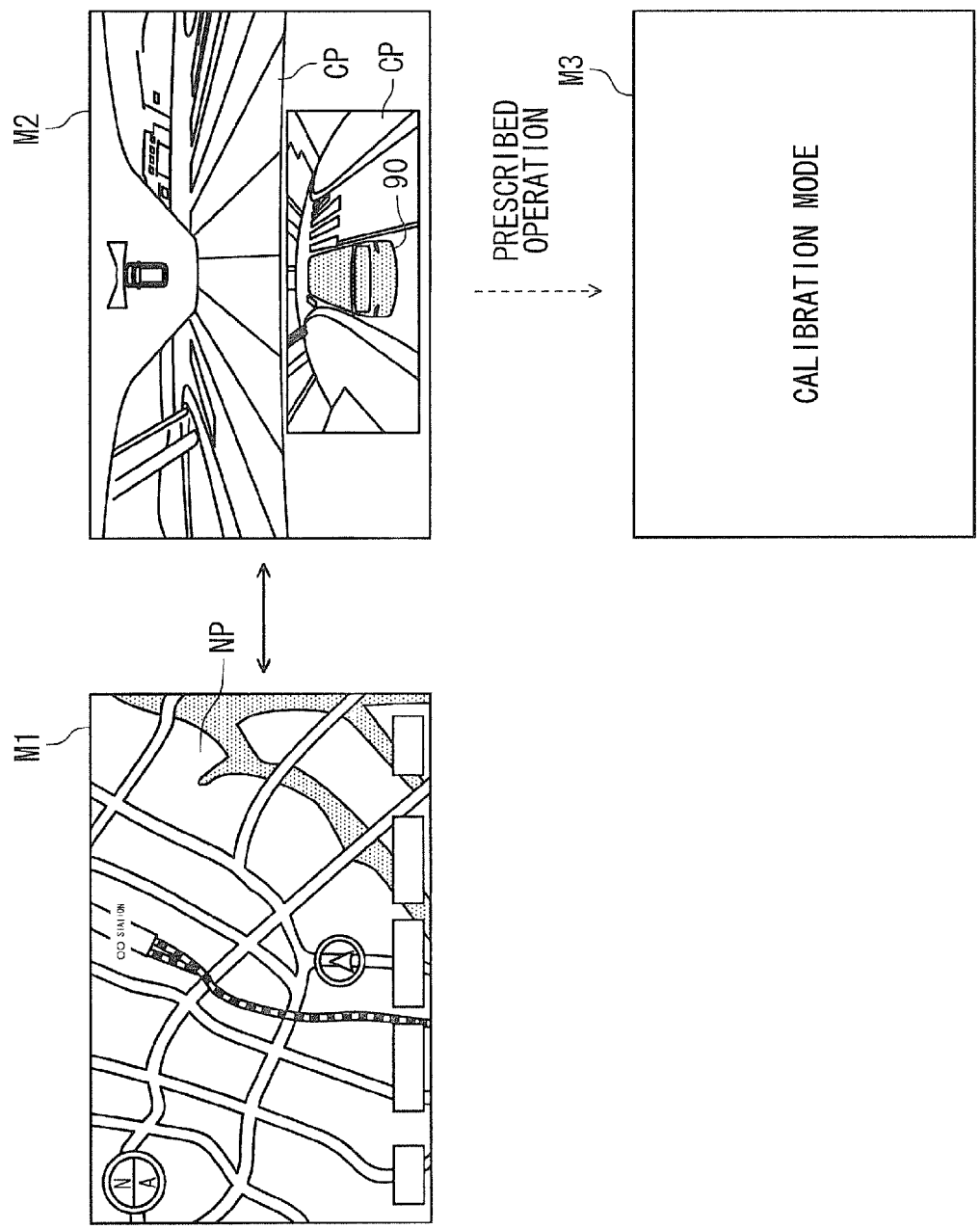
FIG. 5 is a view illustrating transition of an operating mode in an image display device.

As described above, the image display device 1 has a navigation mode and an image display mode as operating modes. FIG. 5 is a view illustrating transition of an operating mode in an image display device 1.

In the navigation mode M1, a screen that contains a map image NP that is used to guide navigation is displayed on the display 33. On the other hand, in the image display mode M2, a screen that contains a synthetic image CP showing the state of the periphery of the vehicle 9 is displayed.

The navigation mode M1 and the image display mode M2 are switched by the mode switching unit depending on a prescribed condition based on signals of the shift sensor 91 and the vehicle speed sensor 92. For example, if the position of a shift lever is "R (Reverse)" in the navigation mode M1, the mode is switched to the image display mode M2, and a screen that contains the synthetic image showing the periphery of the vehicle 9 is displayed. Further, if the traveling speed (km/h) is a prescribed speed (for example, 10 km/h) or less during forward movement in the navigation mode Ml, the mode is switched to the image display mode M2, and a screen that contains the synthetic image showing the state of the front and the side of the vehicle 9 is displayed.

Further, if a prescribed operation is performed through a prescribed operation unit 34 in the image display mode M2, the mode switching unit 11 changes the operating mode to the calibration mode M3 for the calibration process.

<4. Calibration Process>

Figure 6:
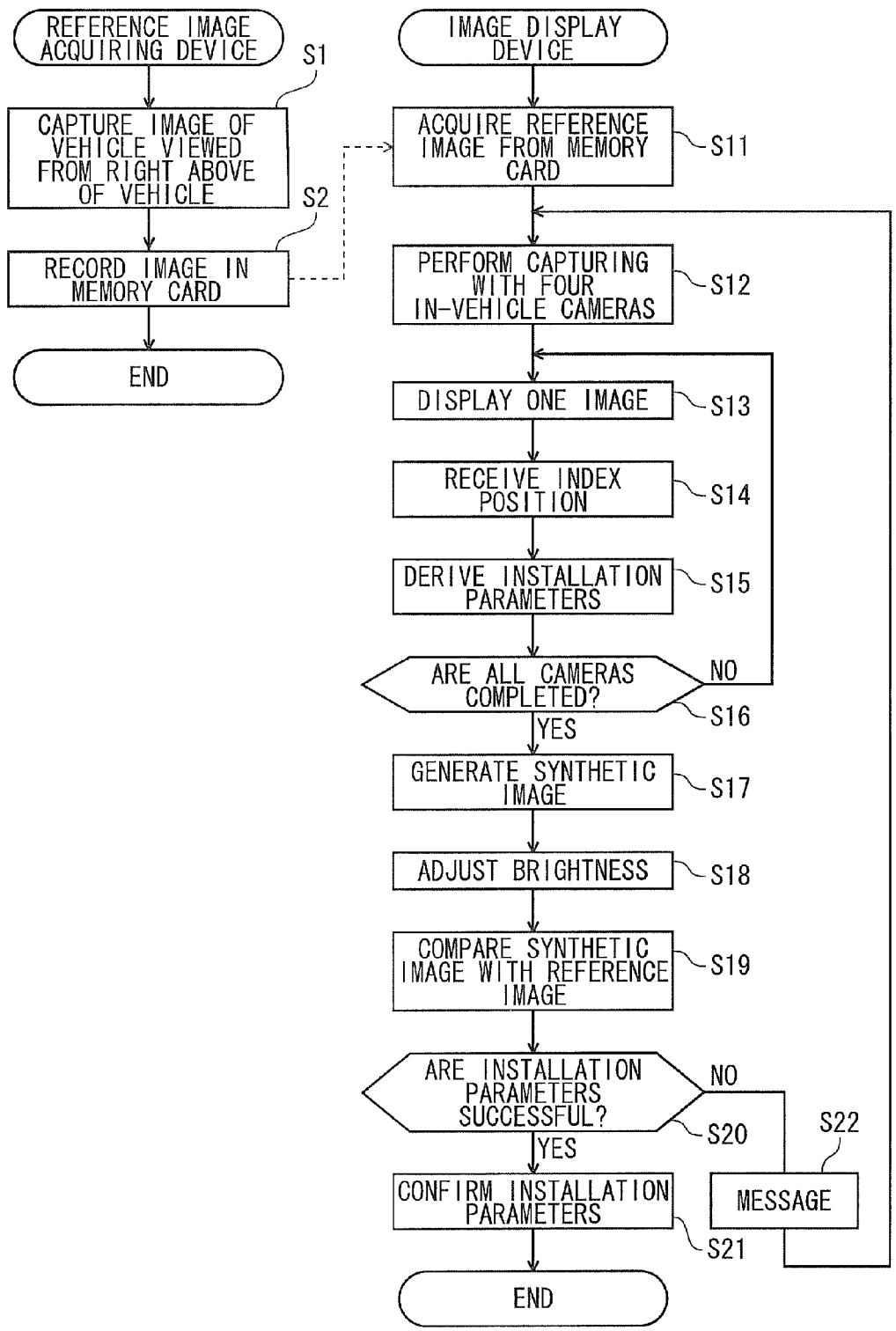
FIG. 6 is a diagram illustrating a processing flow of a calibration process.

FIG. 6 is a diagram illustrating a processing flow of a process related to a calibration process in the parameter determining system 100. In this process, the reference image acquiring device 2 first acquires a reference image (steps S1 and S2). Thereafter, the image display device 1 performs a calibration process (steps S11 to S16) and a calibration judgment (steps S16 to S22). The calibration process (steps S11 to S16) is executed under the control of the calibration unit 13, and the calibration judgment (steps S16 to S22) is executed under the control of the processing judgment unit 14.

Figure 7:
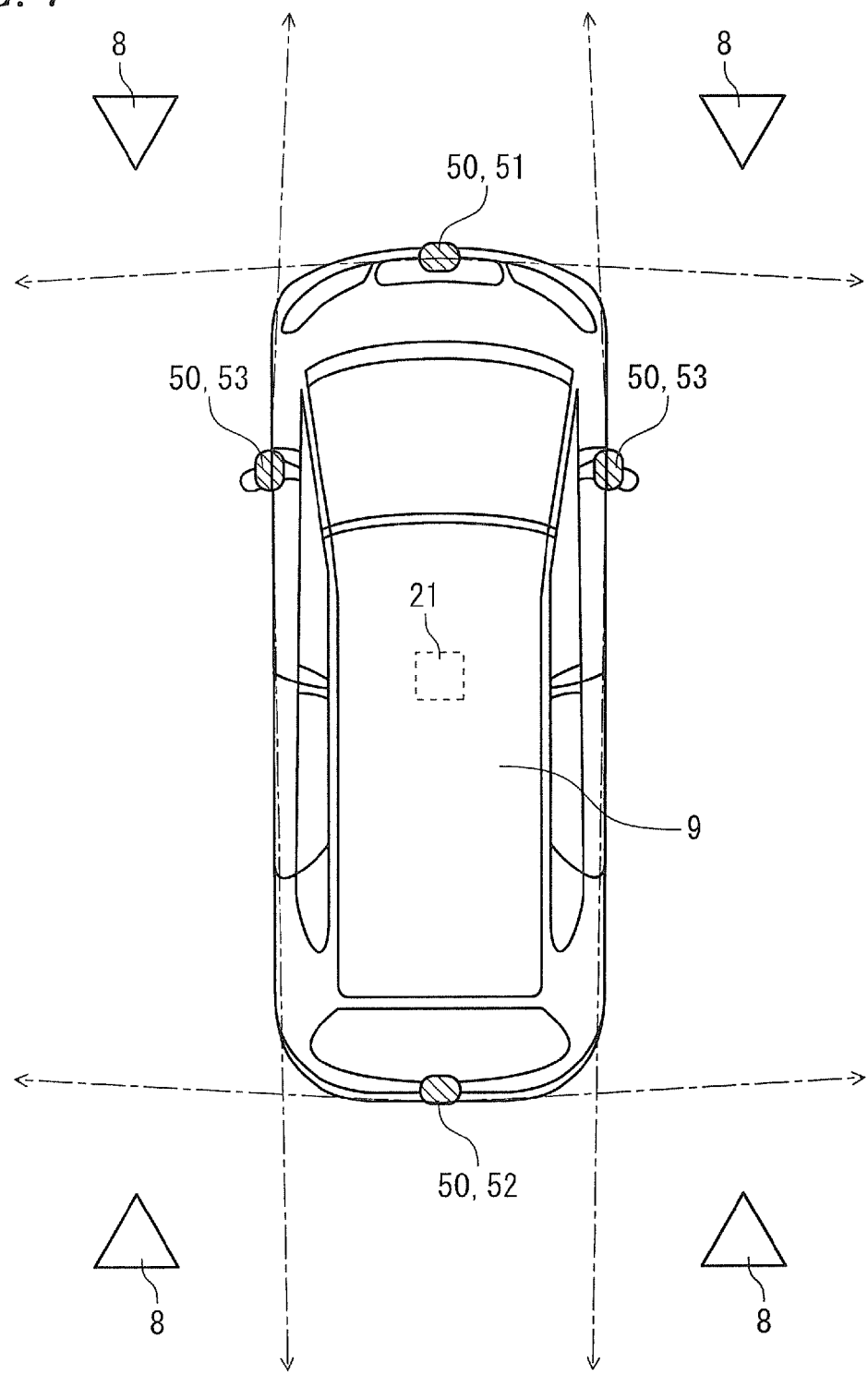
FIG. 7 is a view illustrating how a vehicle is placed.

At a start of this process, the operation mode of the image display device 1 has been a calibration mode M3. Further, as shown in FIG. 7, the vehicle 9 for which the calibration process is to be performed is placed in a prescribed workplace, and four markers 8 are placed around the vehicle 9. The four markers 8 are respectively placed in four areas in which duplicate image capturing is performed by two in-vehicle cameras 50 (that is, respective areas of the left front, right front, left rear, and right rear of the vehicle 9). Each marker 8 is composed of a planar plate and the surface shape has become an equilateral triangle. Further, a vehicle external camera 21 of the reference image acquiring device 2 is placed right above of the center position with respect to both the left and right, and forward and rearward in the vehicle 9 in a state where the optical axis thereof is directed right below.

Figure 8:
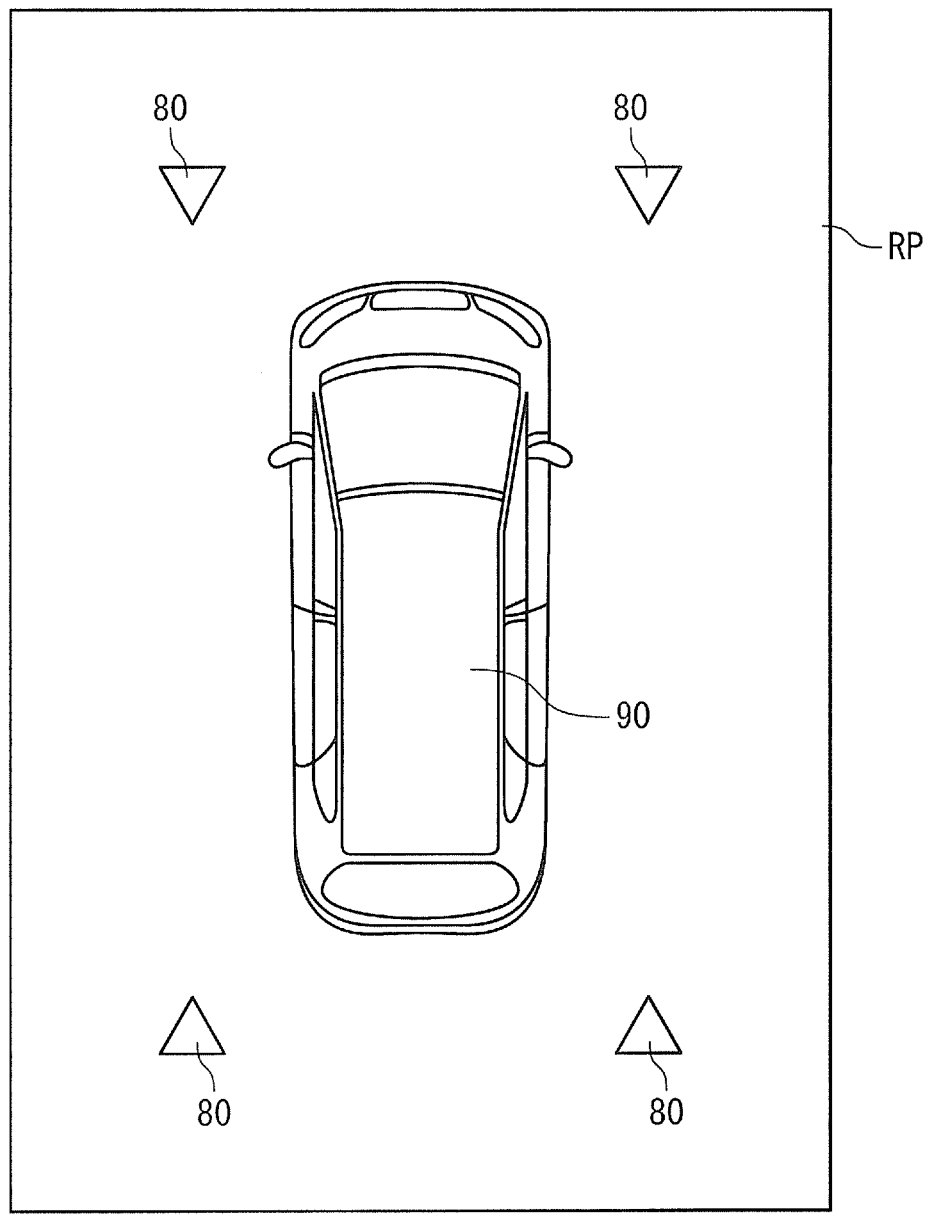
FIG. 8 is a diagram illustrating an example of a reference image.

First, in a state as shown in FIG. 7, one vehicle external camera 21 of the reference image acquiring device 2 performs image capturing with respect to an area that contains the actual vehicle 9 and the neighboring marker 8 as an object (step S1). Through this, an image RP as shown in FIG. 8 is acquired. This image RP contains an image (vehicle image) 90 of the vehicle 9 and an image (marker image) 80 of the marker 8. This image RP is transmitted to the recording unit 22, and is recorded in the memory card MC of the recording unit 22 as a reference image (step S2).

Then, the memory card MC is taken out from the reference image acquiring device 2, and is attached to a card slot of the image display device 1. Then, the image display device 1 reads the reference image RP recorded in the memory card MC and records the reference image RP in the nonvolatile memory 40 (step S11 in FIG. 6).

Then, the four in-vehicle cameras 50 of the vehicle 9 perform the image capturing almost simultaneously to acquire images (step S12).

Figure 9:
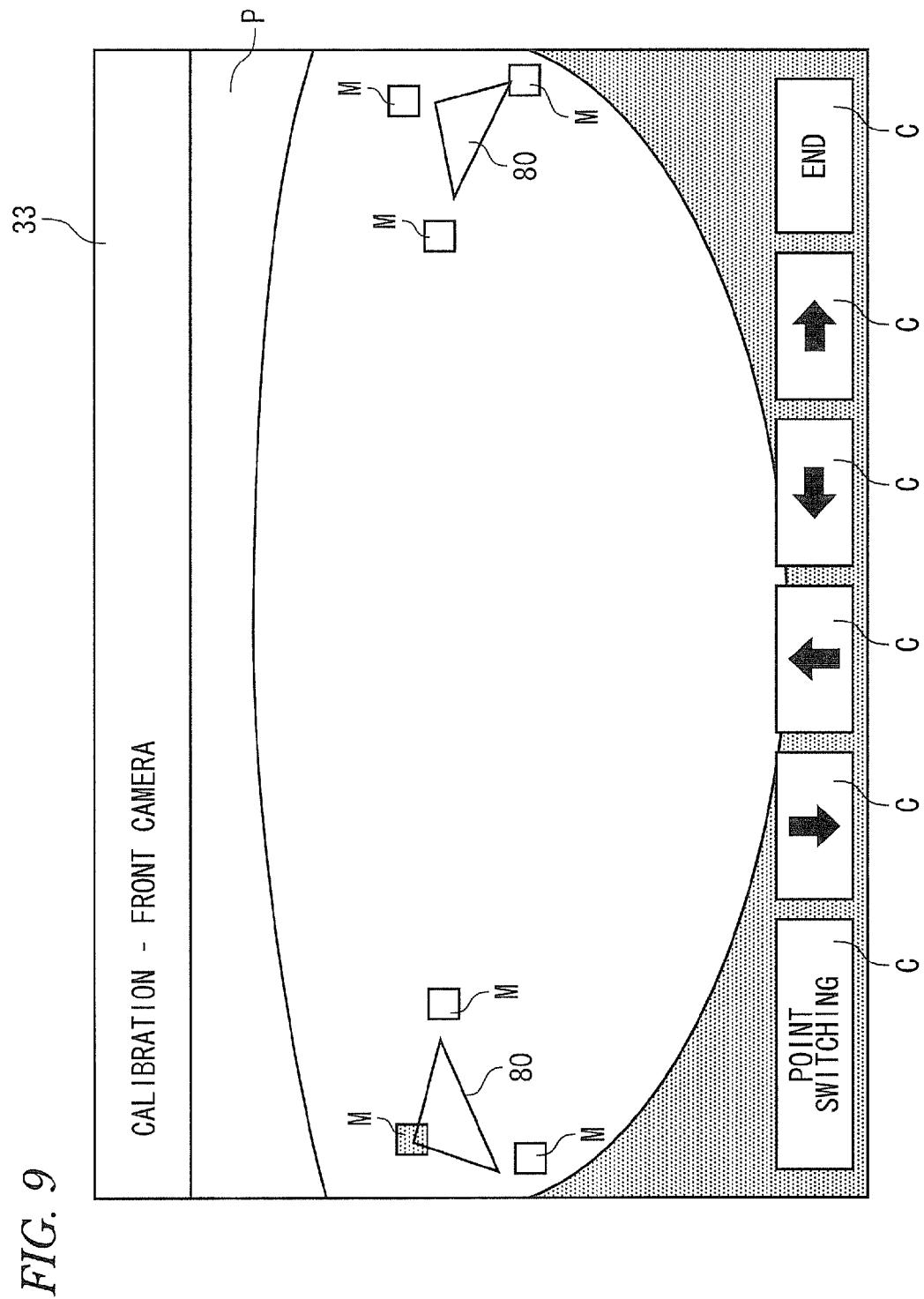
FIG. 9 is a diagram illustrating a display example of a display in the calibration process.

Then, one of the four acquired images is selected as a featured image that is the target of the calibration process, and displayed on the display 33 for the calibration process (step S13). FIG. 9 is a diagram illustrating a display example of the display 33 in this case. As shown in the drawing, the featured image P that is acquired by the in-vehicle camera 50 is displayed on the display 33. This featured image P contains two marker images 80 in the vicinity of the left and right ends.

Further, on the screen, command buttons C that can be operated by the user and point indexes M for specifying the positions of the marker images 80 are displayed. Since the point indexes are to specify the positions of vertexes of the two triangular marker images 80, 6 (=2□3) point indexes M are displayed.

One of the 6 displayed point indexes M is selected by a cursor, and the selected point index M may be moved on the screen through touching of the command buttons C indicating the upper, lower, left, and right directions. Further, by touching the command button C that is referred to as "point switching", it is possible to switch the point index M to be selected. The user (worker who does the work related to the calibration process) touches the command buttons C to move all the point indexes M to the positions of the vertexes of the marker images 80. Further, if the user touches the command button that is referred to as "point switching", the positions of the 6 point indexes M that indicate the positions of the marker images 80 is received in the calibration unit 13 (step S14). On the other hand, it may be configured that the vertexes of the marker images 80 are detected using a proper image recognition technique and 6 point indexes M are automatically moved to the respective vertexes. Further, it may be configured that after automatically moving the point indexes M to the respective vertexes, the user manually moves at least one position of the point indexes M as necessary.

Then, the calibration unit 13 performs a prescribed operation based on the determined positions of the 6 point indexes M to identify the installation parameters of the in-vehicle camera that has acquired the featured image P. For example, the roll angle is identified based on the different in height between the point index M on the left side of the screen and the point index M on the right side of the screen, and the pan angle is identified based on the left and right positions of the screen of the point index M (step S15). The identified installation parameter is recorded in the nonvolatile memory 40.

Then, it is judged whether the calibration process has been performed (that is, whether the installation parameters have been identified) with respect to all the in-vehicle cameras 50 (step S16). If there are non-processed in-vehicle cameras 50, the processing proceeds to step S13 again, and another image is selected as the featured image. Then, in the same manner as above, the installation parameter of the in-vehicle camera that has acquired the feature image is identified. Through repetition of such a process, the installation parameters of all the 4 in-vehicle cameras 50 are identified.

If the installation parameters of all the in-vehicle cameras 50 are identified, in response to this, a synthetic image showing the state of the periphery of the vehicle 9 viewed from the virtual viewpoint is generated by the synthetic image generating unit 32 using the 4 image obtained by the 4 in-vehicle cameras 50 and the derived installation parameters (step S17). At this time, the viewpoint position of the virtual viewpoint is set right above of the center position with respect to both the left and right, and forward and rearward in the vehicle 9 in a state where the optical axis thereof is directed right below. That is, it is set that the positional relationship of the vehicle exterior camera 21 of the actual vehicle 9 and the positional relationship of the virtual viewpoint of the vehicle 9 (vehicle image 90 of the 3D curved surface SP).

Figure 10:
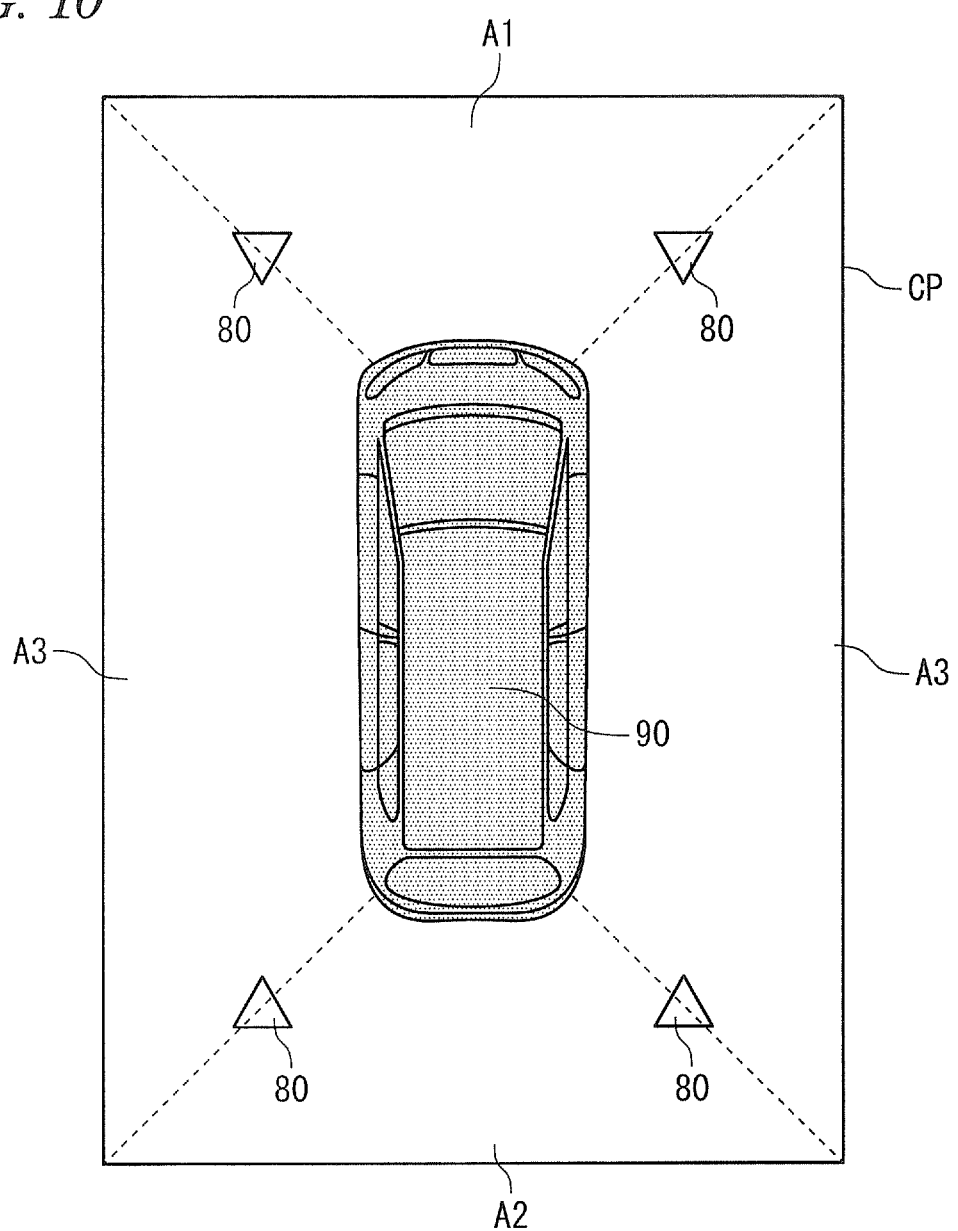
FIG. 10 is a diagram illustrating an example of a synthetic image.
Figure 11:
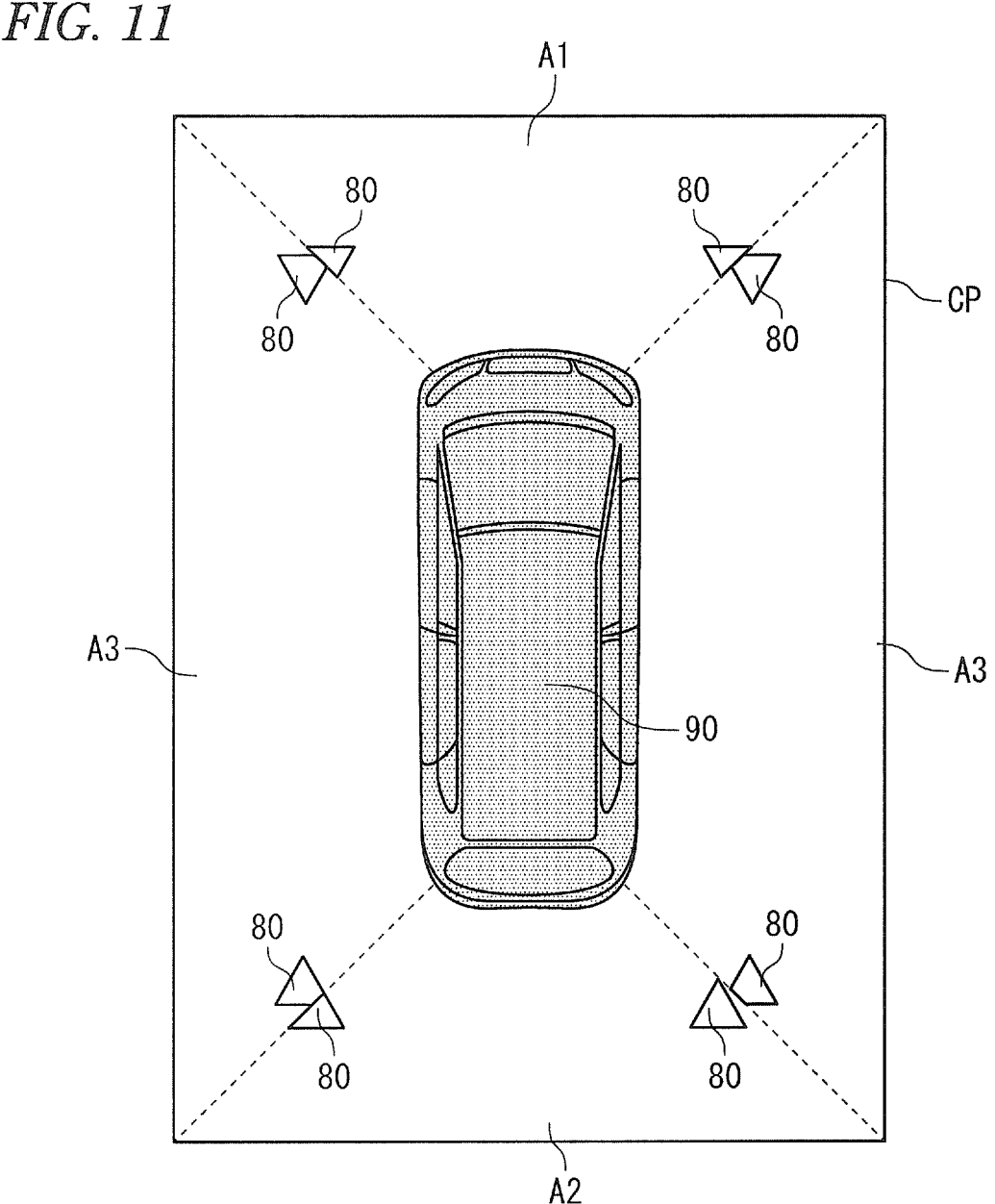
FIG. 11 is a diagram illustrating an example of a synthetic image.

FIG. 10 is a diagram illustrating a synthetic image CP that is generated when the calibration process has been ideally performed. On the other hand, FIG. 11 is a diagram illustrating an example of a synthetic image CP that is generated when the calibration process has not been accurately performed. This synthetic image contains the marker image 80 together with the vehicle image 90, The synthetic image CP is configured by images acquired from the front area A1 of the vehicle image 90 through the front camera 51, acquired from the rear area A2 of the vehicle image 90 through the back camera 52, and acquired from the side area A3 of the vehicle image 90 through the side camera 53, respectively. Accordingly, in the respective areas of the left front, right front, left rear, and the right rear of the vehicle, a connection portion between the images are present. Further, in the connection portion between the images, the marker images 80 are present.

In the case where the calibration process has been ideally performed, as shown in FIG. 10, the marker image 80 expressed in the synthetic image CP becomes equilateral triangle. On the other hand, in the case where the calibration process has not been accurately performed, as shown in FIG. 11, the marker image 80 expressed in the synthetic image CP is separated by the connection portion between the images becomes a distorted shape.

Figure 12:
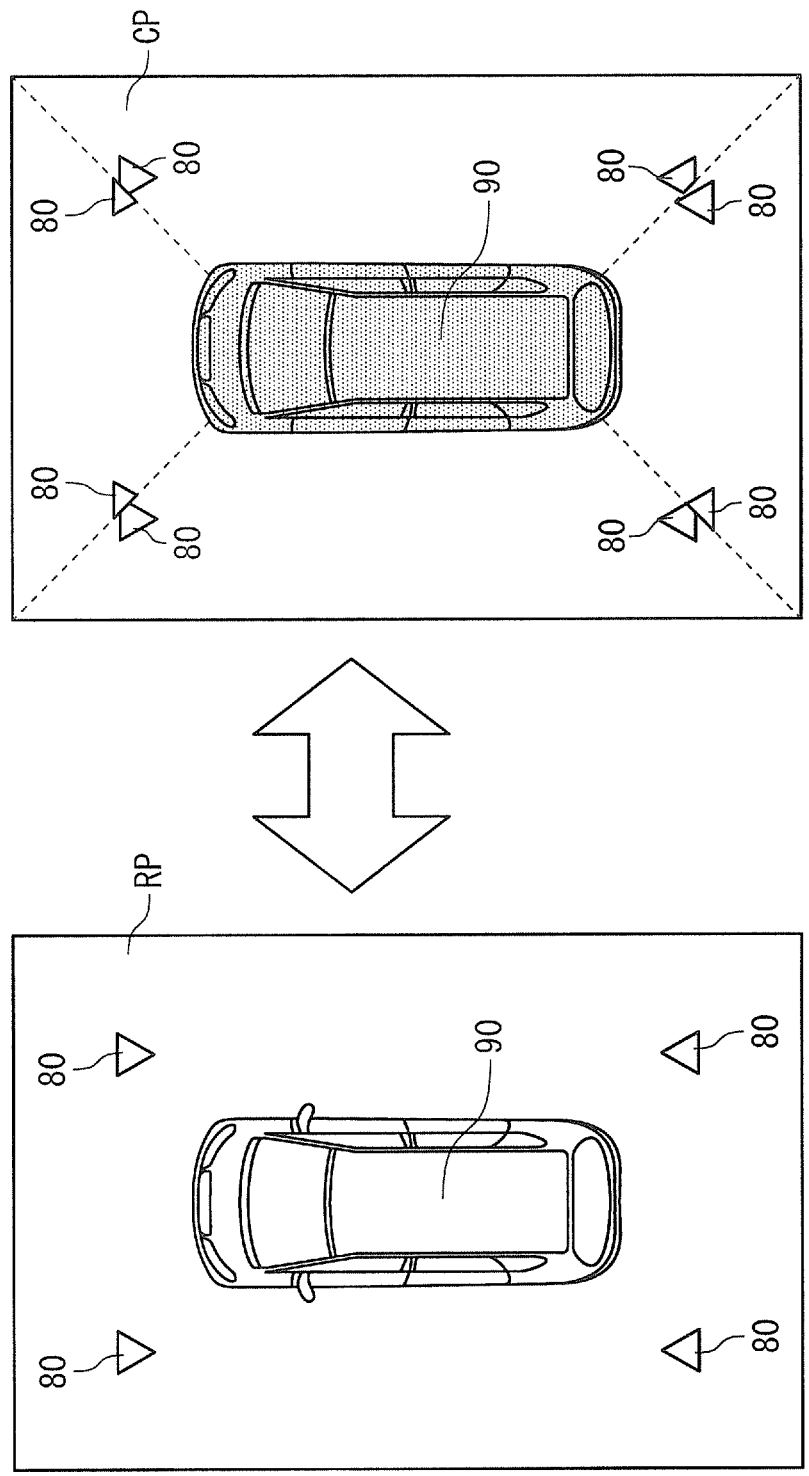
FIG. 12 is a diagram illustrating comparison of a synthetic image with a reference image.

The synthetic image CP of FIG. 10 has almost the same contents as the reference image RP shown in FIG. 8, but the synthetic image CP of FIG. 11 is greatly different from the reference image RP shown in FIG. 8. Because of this, as illustrated in FIG. 12, the processing judgment unit 14 compares the generated synthetic image CP with the reference image RP, and if they are greatly different from each other, the processing judgment unit 14 judges that the calibration process has not been accurately performed.

In this judgment, the processing judgment unit 14 first functions as a brightness adjuster according to the present invention, and before comparing the synthetic image CP with the reference image RP, the processing judgment unit 14 performs the adjustment so that an average brightness of the synthetic image CP substantially matches an average brightness of the reference image RP (step S8). Specifically, the average luminance of the synthetic image CP and the average luminance of the reference image RP are derived. Further, a value that is obtained by dividing the average luminance of the reference image RP by the average luminance of the synthetic image CP is derived as a coefficient, and this coefficient is multiplied to each pixel of the synthetic image CP. Through this, the average brightness of the synthetic image CP substantially matches the average brightness of the reference image RP. Through performing of such brightness adjustment, the comparison of the synthetic image CP with the reference image RP can be accurately performed. If it is possible to match the average brightness of the synthetic image CP and the average brightness of the reference image RP, the parameters to be adjusted are not limited to the luminance, but may be saturation, hue, and their proper combination. Brightness may be used as the reference instead of luminance.

Then, comparison of the synthetic image CP with the reference image RP is performed (step S19). This comparison is possible to employ a variety of well-known image comparison methods. In the present embodiment, an MSE (Mean Square Error) is derived by the following equation (1).

$$MSE = \frac{1}{M \times M'} \sum_{i=1}^{M} \sum_{j=1}^{M'} \{y(i, j) - s(i, j)\}^2 \quad \text{[Equation (1)]}$$

Here, M denotes the number of pixels in the vertical direction, M" denotes the number of pixels in the vertical direction, y(i, j) denotes a pixel value of coordinates (i, j) of a synthetic image CP, and s(i, j) denotes a pixel value of coordinates (i, j) of a reference image RP. That is, the mean square error (MSE) is derived by taking differences between pixels of the same coordinates in the synthetic image CP and the reference image RP, and averaging squares of the differences.

Accordingly, the difference squared error becomes a number indicating the degree of difference between the synthetic image CP and the reference image RP. As the difference squared error becomes smaller, the synthetic image CP and the reference image RP approximate each other, and the synthetic image CP indicates the state of the periphery of the vehicle 9 well. By contrast, as the difference squared error becomes larger, the synthetic image CP becomes different from the reference image RP, and the synthetic image CP is not suitable to indicate the state of the periphery of the vehicle.

Because of this, in the present embodiment, if the difference squared error that becomes the result of comparison between the synthetic image CP and the reference image RP is smaller than a prescribed threshold value, it is judged that the calibration process has been accurately performed and the identified installation parameters are reasonable. By contrast, if the difference squared error is equal to or larger than the prescribed threshold value, it is judged that the calibration process has not been accurately performed and the identified installation parameters are not reasonable.

If it is judged that the installation parameters are reasonable ("Yes" in step S20), it is confirmed that the installation parameters are to be used to generate the synthetic image thereafter, and the installation parameters are recorded in the nonvolatile memory 40 (step S21).

On the other hand, if it is judged that the installation parameters are not reasonable ("No" in step S20), a message that indicates the re-execution of the calibration process is displayed on the display 33 (step S22). Then, the processing returns to step S12, the calibration process is re-executed, and the installation parameters are re-identified based on the user operation. This process is repeated until it is judged that the installation parameters are reasonable. Through this, it is possible to reliably determine proper installation parameters from the viewpoint of the quality of the synthetic image.

As described above, in the calibration process in the image display device 1 according to the present embodiment, the installation parameters of the in-vehicle cameras 50 are identified based on the user operation. The synthetic image showing the state of the periphery of the vehicle 9 viewed from the prescribed virtual viewpoint is generated using the installation parameters and the images obtained by the in-vehicle cameras 50. Then, the generated synthetic image CP is compared with the reference image RP showing the periphery of the vehicle 9 viewed from the prescribed position, and the validity of the installation parameters are judged based on the result of the comparison. Since the validity of the installation parameters is judged through comparison of the generated synthetic image CP with the reference image RP, the proper installation parameters can be determined from the viewpoint of the quality of the synthetic image being generated.

Further, if the calibration process is performed and the set parameters are identified, the validity of the installation parameters is automatically judged in response to this. Because of this, the validity of the installation parameters are judged without accompanying the user operation, and thus the cumbersome user operation is not required to judge the validity of the installation parameters. Further, the installation parameters of which the validity judgment has not been performed are prevented from being used in the subsequent process.

<5. Other Embodiments>

Although the embodiment of the present invention has been described as above, the present invention is not limited to the above-described embodiment, and various modifications can be made. Hereinafter, other embodiments will be described. It is possible to appropriately combine all forms including the form described in the above-described embodiment and the form to be described hereinafter.

<5-1. Pattern>

Figure 13:
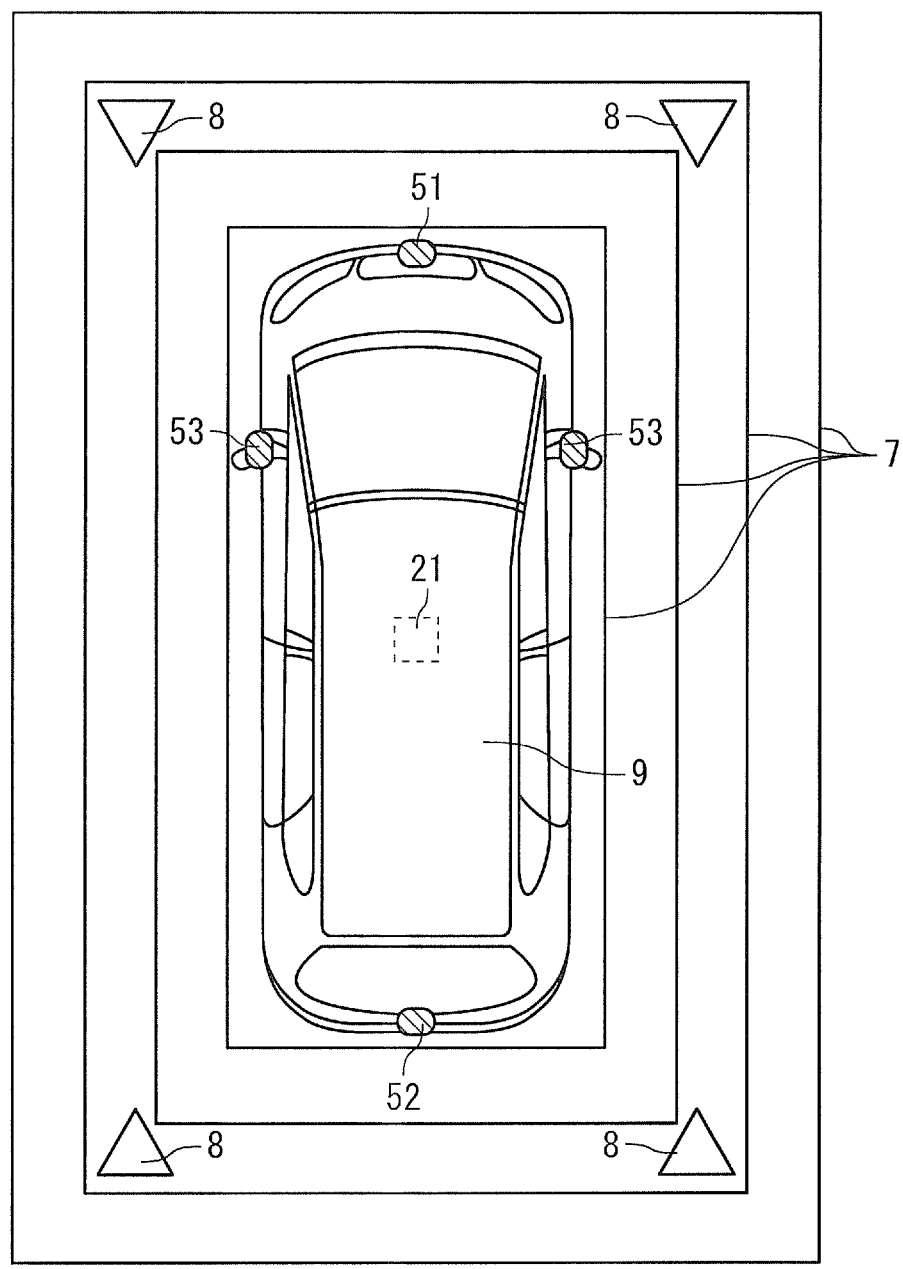
FIG. 13 is a view illustrating how a vehicle is placed.

According to the above-described embodiment, in the case of acquiring the images through the in-vehicle cameras 50 in the calibration process, only 4 markers 8 are placed around the vehicle 9. By contrast, as shown in FIG. 13, in addition to markers 8, the vehicle 9 may be placed on a workplace having a bottom surface on which a prescribed pattern 7 is indicated.

Even in this case, the vehicle is placed in a predetermined position of the workplace. In this state, the pattern 7 is indicated in the periphery of the vehicle 9, and this pattern 7 surrounds the entire periphery of the vehicle 9. In this state, the same process as described above in the embodiment is executed.

Figure 14:
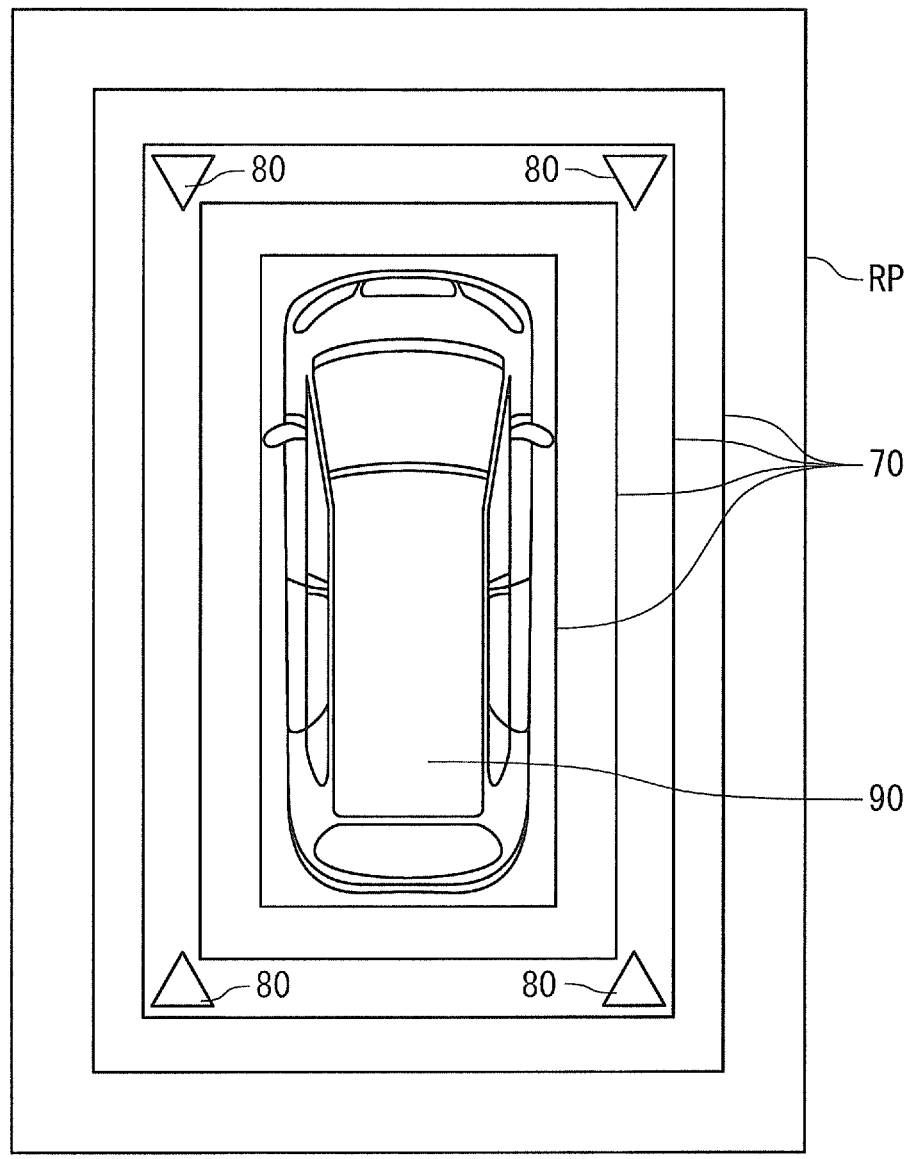
FIG. 14 is a diagram illustrating an example of a reference image.
Figure 15:
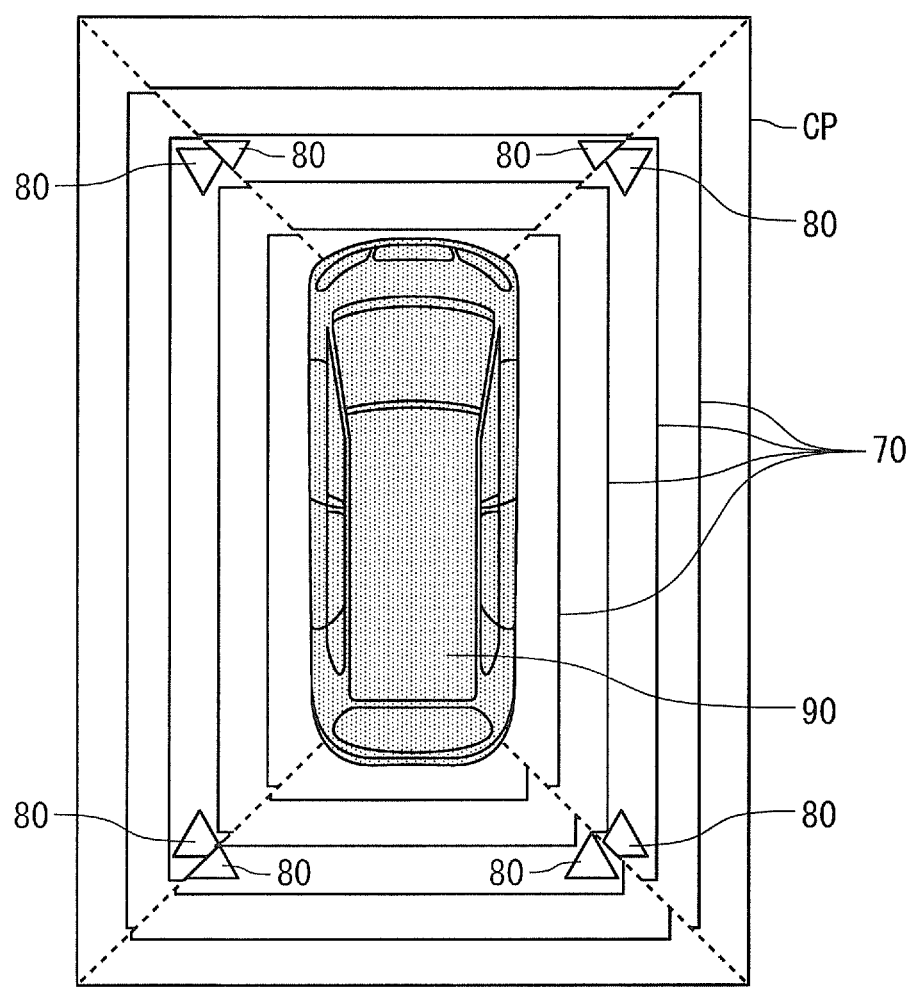
FIG. 15 is a diagram illustrating an example of a synthetic image.

FIG. 14 is a diagram illustrating an example of a reference image RP acquired in this case. The reference image RP contains the vehicle image 90, the marker images 80, and an image of the pattern 7 (pattern image 70). Further, FIG. 15 is a diagram illustrating an example of a synthetic image CP generated when the calibration process has not been accurately performed. Even this synthetic image CP contains the vehicle image 90, the marker images 80, and the pattern image 70.

As can be known through comparison of FIG. 14 with FIG. 15, if the calibration process has not been accurately performed, a difference between the synthetic image CP and the reference image RP occurs in not only the marker image 80 but also the pattern image 70. That is, although the difference of the marker images 80 in the synthetic image CP and the reference image RP occurs only on the connection portion between the images, the difference between the pattern images occurs on the entire periphery of the vehicle image 90. Because of this, in comparing the synthetic image CP with the reference image RP, the extent of their differences can be shown greater. Through this, it becomes possible to make an accurate comparison of the synthetic image CP and the reference image RP in comparison to a case where only the markers 8 are placed. Further, since the pattern 7 surrounds the entire periphery of the vehicle 9, it is possible to determine proper installation parameters from the viewpoint of the quality of the synthetic image showing the entire periphery of the vehicle 9.

<5-2. Reference Image>

In the above-described embodiment, the reference image RP is acquired by actually acquiring the image of the vehicle 9 through the vehicle external camera 21. By contrast, the reference image that contains the vehicle image and the marker image may be pre-stored in the nonvolatile memory 40 and the image capturing may not be actually performed. In this case, as the reference image, it is possible to use a picture prepared by CG or the like rather than the actual image. Accordingly, the reference image acquiring device 2 becomes unnecessary, and it is possible to determine appropriate installation parameters in a simpler configuration.

However, in this case, it is required to accurately place the positional relationship between the vehicle 9 and the marker 8 in performing the calibration process. On the point that the appropriate installation parameters can be determined even if the positional relationship between the vehicle 9 and the marker 8 is somewhat inaccurate, it is preferable to acquire the reference image RP through actual image capturing of the vehicle 9 as in the above-described embodiment.

<5-3. Other Modified Examples>

In the above-described embodiment, the vehicle external camera 21 is placed right above of the vehicle 9, and the viewpoint position of the virtual viewpoint is set right above of the vehicle 9. By contrast, the position of the virtual viewpoint for the vehicle external camera 21 or the vehicle 9 may be a front or rear position of the vehicle 9. That is, the positional relationship between the actual vehicle 9 and the vehicle external camera 21 and the positional relationship between the vehicle 9 (vehicle image 90 on the 3D curved surface SP) and the virtual viewpoint may be the same. However, on the point of determining the installation parameters that enable appropriate generation of the synthetic image showing the entire periphery of the vehicle 9, it is preferable to make the position of the vehicle external camera 21 or the virtual viewpoint right above of the vehicle 9.

Further, in the above-described embodiment, before the synthetic image CP is compared with the reference image RP, the adjustment is performed so that the average brightness of the synthetic image CP substantially matches the average brightness of the reference image RP. By contrast, before the synthetic image CP is compared with the reference image RP, the adjustment may be performed so that the size or position of the object image in the synthetic image CP substantially matches the size or position of the object image in the reference image RP. That is, the adjustment may be performed on the basis of the position or size of the vehicle image 90 contained in the synthetic image CP and the reference image RP. By doing so, the comparison of the synthetic image CP with the reference image RP can be performed more accurately.

Further, in the above-described embodiment, when the synthetic image CP is compared with the reference image RP, the comparison is performed with respect to the entire area of the image. However, the comparison may be performed using only the peripheral area except for the vehicle image 90 or only the areas of the left front, right front, left rear, and right rear of the vehicle image 90 in which the marker images 80 are present.

Further, in the above-described embodiment, various functions are realized by software through the arithmetic processing of the CPU according to the program. However, part of such functions may be realized by electric hardware circuits. On the other hand, part of the functions realized by the hardware circuits may be realized by software.

Priority is claimed on Japanese Patent Application No. 2010-012213 filed in the Japan Patent Office on Jan. 22, 2010, the contents of which are incorporated herein by reference.

The invention claimed is:

1. A parameter determining device configured to be installed in a vehicle, comprising:
   an image acquirer configured to acquire camera images captured by cameras provided on the vehicle;
   a parameter identifier configured to identify installation parameters of the cameras based on the acquired camera images;
   a synthetic image generator configured to generate a synthetic image based on the acquired camera images and the identified installation parameters, the synthetic image showing a periphery of the vehicle viewed from a prescribed virtual viewpoint; and
   a validity judge configured to compare the synthetic image with a reference image to judge whether validity of the identified installation parameters, the reference image showing the periphery of the vehicle viewed from a prescribed position.

2. The parameter determining device according to claim 1, wherein the reference image is an actual image of the periphery of the vehicle which is captured by an external camera disposed in an outside of the vehicle.

3. The parameter determining device according to claim 1, wherein each of the prescribed virtual viewpoint and the prescribed position is right above of the vehicle.

4. The parameter determining device according to claim 1, further comprising a brightness adjuster configured to adjust an average brightness of the synthetic image to be coincident with an average brightness of the reference image, before the validity judge compares the synthetic image with the reference image.

5. The parameter determining device according to claim 1, wherein each of the synthetic image and the reference image contains a pattern at the periphery of the vehicle.

6. The parameter determining device according to claim 5, wherein the pattern entirely surrounds the vehicle.

7. The parameter determining device according to claim 1, wherein the validity judge is configured to automatically judge the validity of the installation parameters when the installation parameters are identified.

8. The parameter determining device according to claim 1, further comprising a storage configured to store the reference image.

9. A parameter determining system, comprising:
   an external camera configured to capture an image of a periphery of a vehicle viewed from a prescribed position as a reference image;
   cameras provided on the vehicle; and
   a parameter determining device configured to be installed in the vehicle, comprising:
      an image acquirer configured to acquire camera images captured by the cameras;
      a parameter identifier configured to identify installation parameters of the cameras based on the acquired camera images;
      a synthetic image generator configured to generate a synthetic image based on the acquired camera images and the identified installation parameters, the synthetic image showing a periphery of the vehicle viewed from a prescribed virtual viewpoint; and
      a validity judge configured to compare the synthetic image with the reference image to judge whether validity of the identified installation parameters.

10. The parameter determining system according to claim 9, further comprising a pattern arranged to be disposed at the periphery of the vehicle.

11. The parameter determining system according to claim 10, wherein the pattern is arranged so as to entirely surround the vehicle.

12. A parameter determining method, comprising:
   acquiring camera images captured by cameras provided on a vehicle;
   identifying installation parameters of the cameras based on the acquired camera images;
   generating a synthetic image based on the acquired camera images and the identified installation parameters, the synthetic image showing a periphery of the vehicle viewed from a prescribed virtual viewpoint; and
   comparing the synthetic image with a reference image to judge whether validity of the identified installation parameters, the reference image showing the periphery of the vehicle viewed from a prescribed position.

13. The parameter determining method according to claim 12, further comprising:
   placing the vehicle at a prescribed location so that a pattern is disposed in the periphery of the vehicle; and
   capturing an actual image of the periphery of the vehicle with an external camera disposed in an outside of the vehicle, as the reference image.

14. A non-transitory recording medium having recorded a computer-readable program configured to cause a computer to execute the parameter determining method according to claim 12.

* * * * *